(12) United States Patent
Wang et al.

(10) Patent No.: US 11,288,129 B2
(45) Date of Patent: Mar. 29, 2022

(54) TIERING DATA TO A COLD STORAGE TIER OF CLOUD OBJECT STORAGE

(71) Applicant: VMware, Inc., Palo Alto, CA (US)

(72) Inventors: Wenguang Wang, Santa Clara, CA (US); Vamsi Gunturu, Cupertino, CA (US); Junlong Gao, Santa Clara, CA (US); Petr Vandrovec, Cupertino, CA (US); Ilya Languev, Santa Cruz, CA (US); Maxime Austruy, Lausanne (CH); Ilia Sokolinski, Boston, MA (US); Satish Pudi, Saratoga, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/002,577

(22) Filed: Aug. 25, 2020

(65) Prior Publication Data

US 2022/0066882 A1 Mar. 3, 2022

(51) Int. Cl.
*G06F 11/14* (2006.01)
*G06F 3/06* (2006.01)
*G06F 12/02* (2006.01)

(52) U.S. Cl.
CPC .......... *G06F 11/1451* (2013.01); *G06F 3/064* (2013.01); *G06F 3/0604* (2013.01); *G06F 3/067* (2013.01); *G06F 3/0626* (2013.01); *G06F 3/0652* (2013.01); *G06F 11/1461* (2013.01); *G06F 11/1469* (2013.01); *G06F 12/0253* (2013.01); *G06F 2201/84* (2013.01); *G06F 2212/1044* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,789,205 | B1 * | 9/2020 | Haravu | G06F 11/1464 |
| 2019/0005106 | A1 * | 1/2019 | Kalach | G06F 16/178 |
| 2019/0310935 | A1 * | 10/2019 | Shuster | G06F 12/0253 |
| 2020/0019620 | A1 * | 1/2020 | Sarda | G06F 16/113 |
| 2021/0109818 | A1 * | 4/2021 | Perneti | G06F 3/0617 |

* cited by examiner

*Primary Examiner* — Masud K Khan

(57) ABSTRACT

Techniques for tiering data to a cold storage tier of a cloud object storage platform are provided. In one set of embodiments, a computer system can identify one or more old snapshots of a data set that reside in a first storage tier of the cloud object storage platform, where the one or more old snapshots are snapshots that are unlikely to be deleted from the cloud object storage platform within a period of N days. The computer system can further, for each snapshot in the one or more old snapshots: identify one or more data blocks in the snapshot that are superseded by a more recent snapshot in the one or more old snapshots; write the one or more data blocks to a second (i.e., cold) storage tier of the cloud object storage platform that has a lower storage cost than the first storage tier; and cause the one or more data blocks to be deleted from the first storage tier.

18 Claims, 10 Drawing Sheets

TIERING DATA TO A COLD STORAGE TIER OF CLOUD OBJECT STORAGE

BACKGROUND

Object storage is a data storage model that manages data in the form of logical containers known as objects, rather than in the form of files (as in file storage) or blocks (as in block storage). Cloud object storage is an implementation of object storage that maintains these objects on a cloud infrastructure, which is a server infrastructure that is accessible via the Internet. Due to its high scalability, high durability, and relatively low cost, cloud object storage is commonly used by companies to backup large volumes of data for disaster recovery and long-term retention/archival.

Several cloud object storage platforms such as Amazon Simple Storage Service (S3), Microsoft Azure Blob Storage, and the like offer at least two different storage tiers to customers: (1) a "standard" storage tier that is the default storage tier of the platform and is intended for data which may be accessed frequently, and (2) a "cold" storage tier that is intended for data which is seldom accessed (e.g., on a semi-annual basis or less). The main benefit of the cold storage tier over the standard storage tier is lower storage cost; for example, in the case of Amazon S3, its cheapest cold storage tier (known as "glacier deep archive") is 23 times less expensive per gigabyte (GB) than its standard storage tier. However, because the cold storage tier is designed to store infrequently accessed data, the latency for retrieving data maintained in this tier and the application programming interface (API) cost for invoking each retrieval operation is significantly higher. In addition, many cloud object storage providers impose a "minimum storage duration" on cold storage tier data, which means that any data kept in the cold storage tier for a time period shorter than this duration will incur an early deletion fee equal to the storage charge for the remaining days of the minimum storage duration.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques that can be implemented by a cloud object storage-based data backup system (i.e., "COS-DB system") for tiering, or in other words moving, backed-up data from a standard storage tier of a cloud object storage platform to a cold storage tier of that platform. In one set of embodiments, the COS-DB system can identify old snapshots of a data set that reside in the standard storage tier, where an "old" snapshot is one that is unlikely to be deleted from the cloud object storage platform within a minimum storage duration imposed by the cloud object storage provider on cold storage tier data. For example, if the minimum storage duration is N days, an old snapshot may be defined as a snapshot created/uploaded at least N days ago. The COS-DB system can then, for each old snapshot, (1) identify data blocks in the old snapshot that are superseded by later (i.e., more recent) old snapshots of the data set, (2) write the data blocks to the cold storage tier, and (3) cause the data blocks to be garbage collected/deleted from the standard storage tier.

By moving snapshot data blocks from the more expensive standard storage tier to the less expensive cold storage tier as described above, the COS-DB system can significantly reduce the cost of maintaining that data in the cloud object storage platform. At the same time, by limiting this tiering to the superseded data blocks of old snapshots, the COS-DB system can avoid issues that may arise in accessing and deleting tiered data due to the restrictions of the cold storage tier (e.g., high retrieval latency, high retrieval API cost, minimum storage duration fees, etc.). The foregoing and other aspects of the present disclosure are described in further detail below.

2. Operating Environment and COS-DB System Architecture

Figure 1:
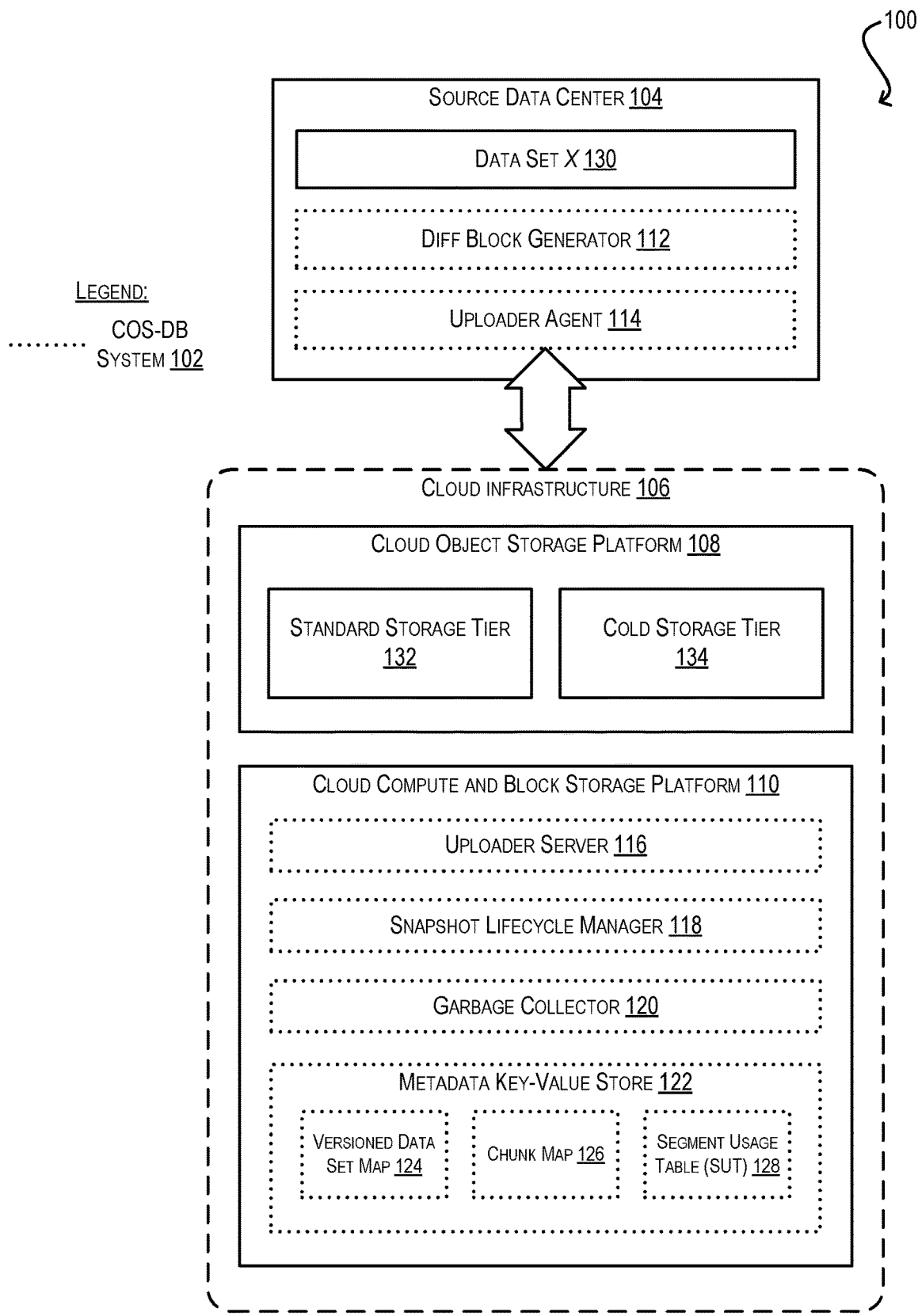
FIG. 1 depicts an operating environment and example cloud object storage-based data backup (COS-DB) system according to certain embodiments.

FIG. 1 depicts an operating environment 100 and an example COS-DB system 102 in which embodiments of the present disclosure may be implemented. As shown, operating environment 100 includes a source data center 104 that is communicatively coupled with a cloud infrastructure 106 comprising a cloud object storage platform 108 and a cloud compute and block storage platform 110. Examples of cloud object storage platform 108 include Amazon S3, Microsoft Azure Blob Storage, and Google Cloud Storage. Examples of cloud compute and block storage platform 110 include Amazon Elastic Compute Cloud (EC2) and Elastic Block Store (EBS), Microsoft Azure Virtual Machines (VMs) and Managed Disks (MDs), and Google Compute Engine (CE) and Persistent Disks (PDs).

COS-DB system 102—whose components are depicted via dotted lines—includes a diff block generator 112 and an uploader agent 114 in source data center 104 and an uploader server 116, a snapshot lifecycle manager 118, a garbage collector 120, and a metadata key-value store 122 (comprising a versioned data set map 124, a chunk map 126, and a segment usage table (SUT) 128) in cloud compute and block storage platform 110. The primary objective of COS-DB system 102 is to backup, on an ongoing basis, a data set X (reference numeral 130) maintained at source data center 104 to cloud object storage platform 108 for disaster recovery, long-term retention, and/or other purposes. Data set X may be, e.g., a virtual disk file, a Kubernetes persistent volume, a virtual storage area network (vSAN) object, or any other logical collection of data. The following subsections provide brief descriptions of components 112-128 and how they enable COS-DB system 102 to achieve this objective.

2.1 Diff Block Generator, Uploader Agent, and Uploader Server

Diff block generator 112, uploader agent 114, and uploader server 116 are components of COS-DB system 102 that work in concert to upload incremental point-in-time versions (i.e., snapshots) of data set X from source data center 104 to cloud object storage platform 108, thereby backing up data set X in platform 108. The present disclosure assumes that these snapshots are uploaded to a standard storage tier 132 of cloud object storage platform 108, which is the platform's default storage tier. Accordingly, all references herein to uploading snapshot data/metadata from source data center 104 "to cloud object storage platform 108" can be understood as uploading such data/metadata "to standard storage tier 132 of cloud object storage platform 108." As shown in FIG. 1, cloud object storage platform 108 also includes a cold storage tier 134 distinct from standard storage tier 132, which is discussed in the context of the tiering techniques of the present disclosure in sections (3) and (4) below.

Figure 2:
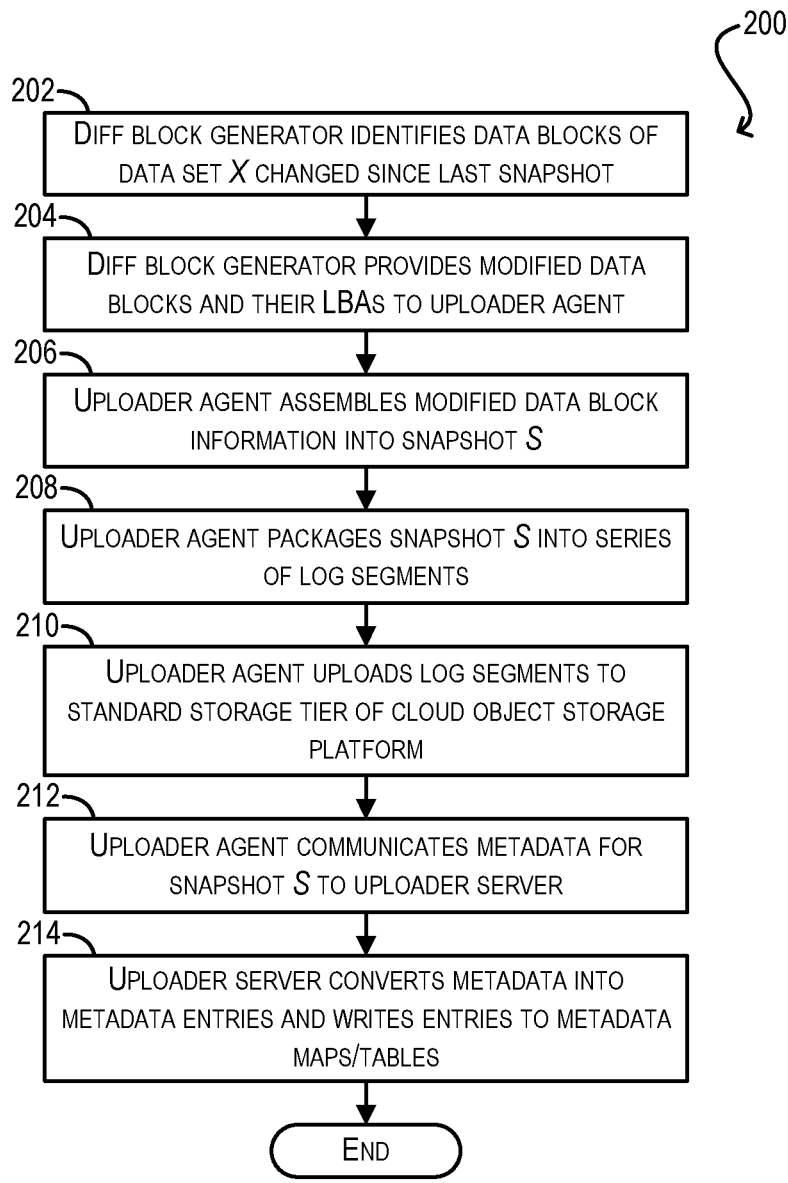
FIG. 2 depicts a snapshot upload workflow according to certain embodiments.

FIG. 2 depicts a workflow 200 that can be executed by diff block generator 112, uploader agent 114, and uploader server 116 of COS-DB system 102 for uploading a snapshot of data set X to cloud object storage platform 108 according to certain embodiments. Starting with steps 202 and 204, diff block generator 112 can identify data blocks in data set X that have changed since the last snapshot upload for X and can provide these modified data blocks, along with their logical block addresses (LBAs), to uploader agent 114. In the case where no snapshot has previously been uploaded for data set X, diff block generator 112 can provide all data blocks of X to uploader agent 114 at step 204.

At step 206, uploader agent 114 can receive the data block information from diff block generator 112 and assemble it into a snapshot S composed of, e.g., <LBA, data block> tuples. Uploader agent 114 can further package these tuples into data objects, referred to herein as "log segments," which conform to the object format of cloud object storage platform 108 (step 208). Uploader agent 114 can then upload (i.e., write) each log segment to standard storage tier 132 (step 210), thereby persisting snapshot S there. As suggested by the name "log segment," uploader agent 114 performs the upload of these segments in a log-structured manner, such that they do not overwrite existing log segments which contain data for overlapping LBAs of data set X Stated another way, uploader agent 114 uploads/writes every log segment as an entirely new object in cloud object storage platform 108, regardless of whether it includes LBAs that overlap previously uploaded/written log segments.

Upon uploading the log segments at step 210, uploader agent 114 can communicate metadata pertaining to snapshot S to uploader server 116 (step 212). This metadata can include, e.g., an identifier of data set X, an identifier of snapshot 5, mappings between the data blocks/LBAs of snapshot S and their corresponding log segments, an upload timestamp for snapshot 5, and so on. Finally, at step 214, uploader server 116 can convert this metadata into a set of metadata entries that conform to the schemas of versioned data set map 124, chunk map 126, and SUT 128 and can write the metadata entries to these maps/tables.

Figure 3A:
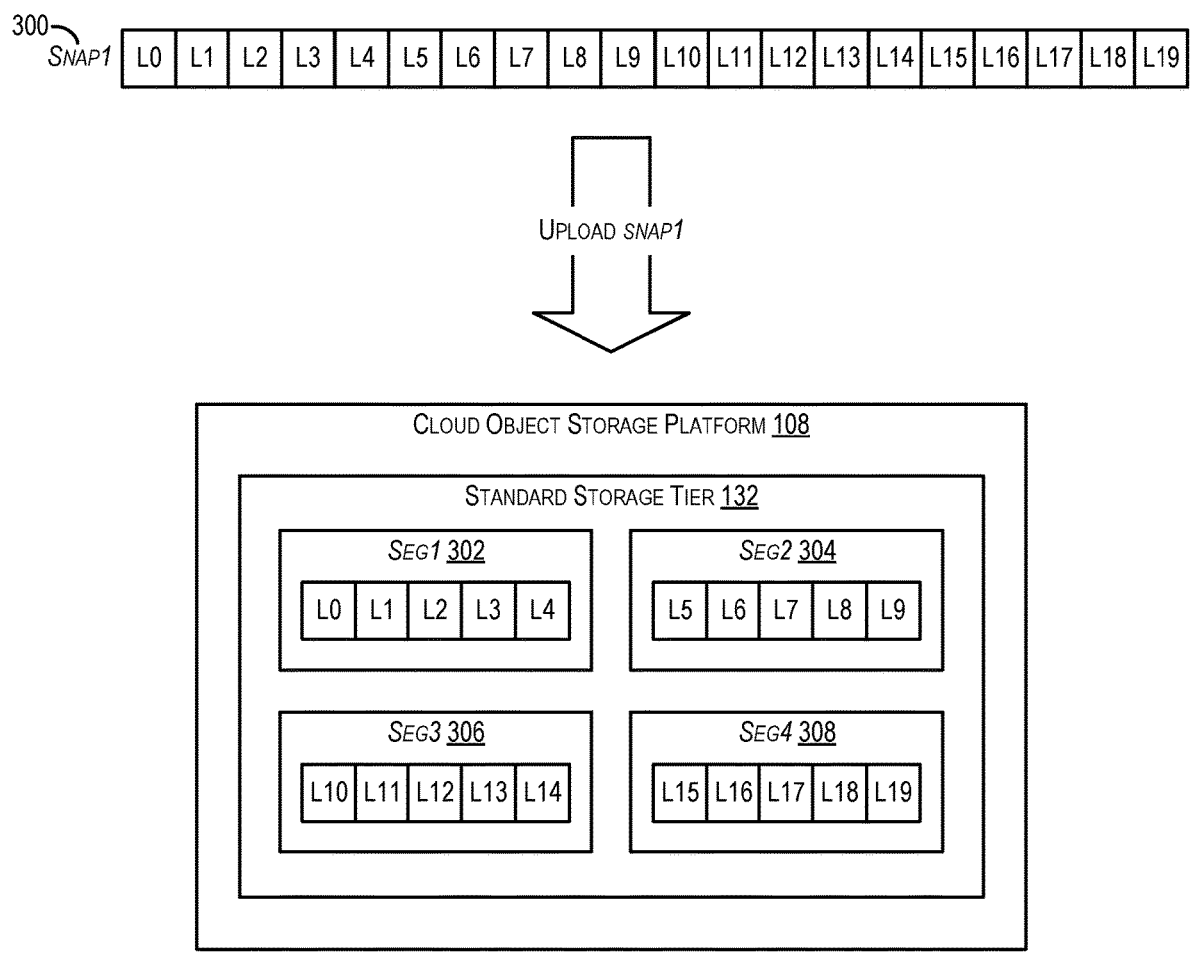
FIGS. 3A, 3B, and 3C depict example snapshot upload scenarios.
Figure 3B:
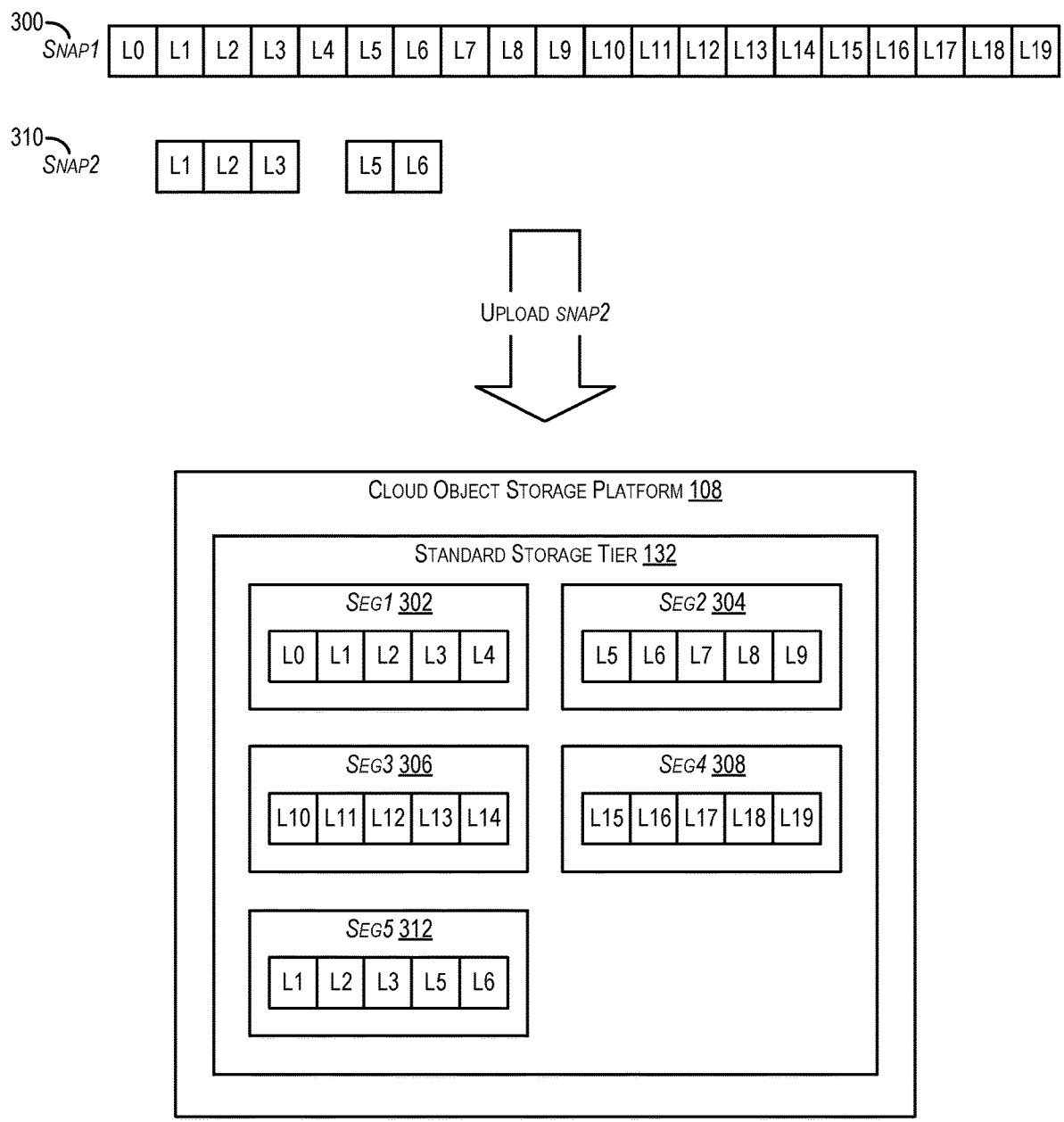
Figure 3C:
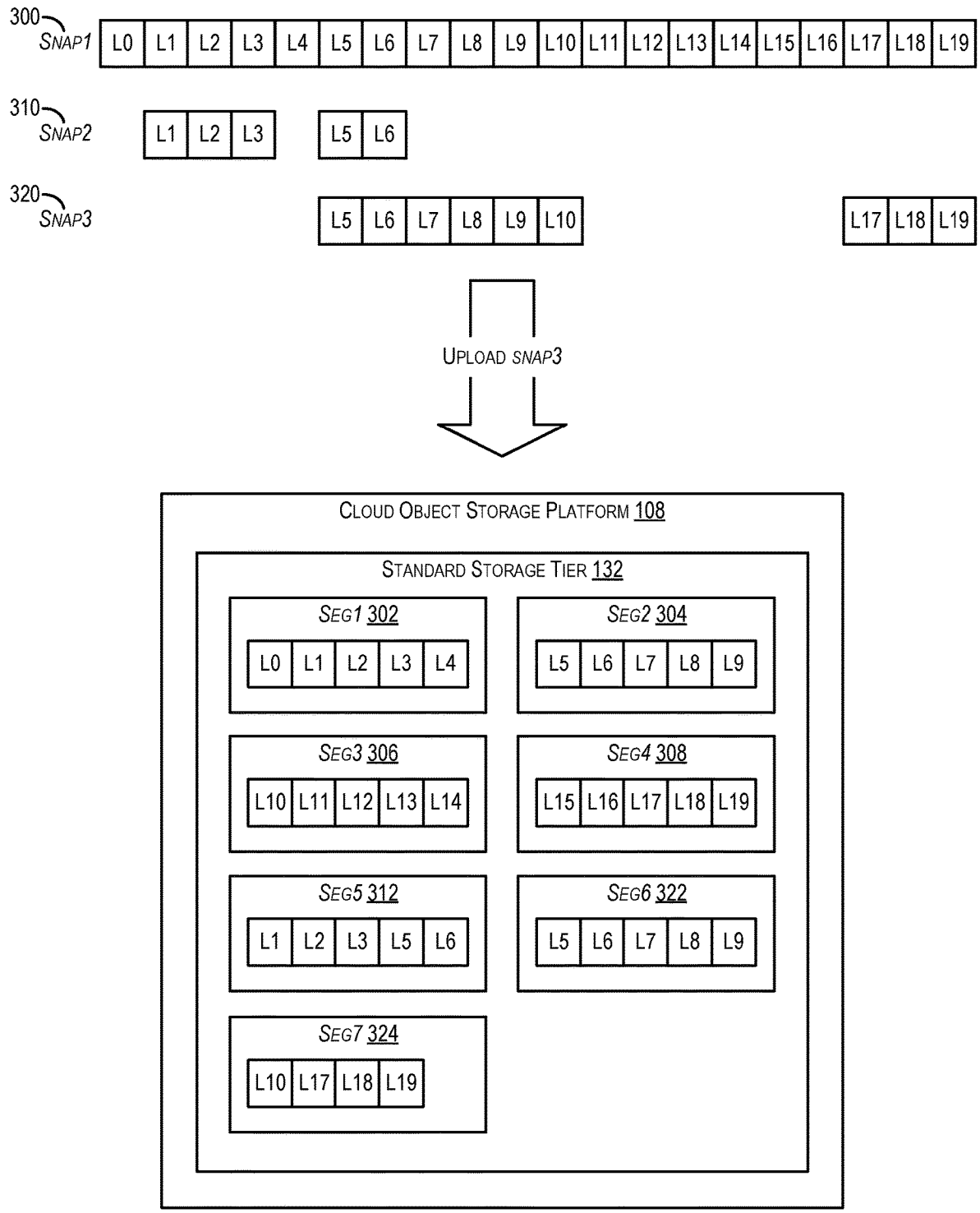

To clarify the foregoing, FIGS. 3A, 3B, and 3C depict three example snapshots of data set X (i.e., snap1 (reference numeral 300), snap2 (reference numeral 310), and snap3 (reference numeral 320)) that may be uploaded to cloud object storage platform 108 in accordance with workflow 200 and the log segments that may be created in standard storage tier 132 of platform 108 per step 210 of the workflow. As shown in FIG. 3A, snapshot snap1 includes twenty data blocks having LBAs L0-L19 and the upload of this snapshot creates four log segments in standard storage tier 132 (assuming a max segment size of five data blocks): seg1 (reference numeral 302) comprising data blocks L0-L4 of snap1, seg2 (reference numeral 304) comprising data blocks L5-L9 of snap1, seg3 (reference numeral 306) comprising data blocks L10-L14 of snap1, and seg4 (reference numeral 308) comprising data blocks L15-L19 of snap1.

Further, as shown in FIG. 3B, snapshot snap2 includes five data blocks L1-L3, L5, and L6 (which represent the content of data set X that has changed since snap1) and the upload of snap2 creates one additional log segment in standard storage tier 132: seg2 (reference numeral 312) comprising data blocks L1-L3, L5, and L6 of snap2. Note that the prior versions of data blocks L1-L3, L5, and L6 associated with snap1 and included in existing log segments seg1 and seg2 are not overwritten by the upload of snap2; however, these prior data block versions are considered "superseded" by snap2 because they no longer reflect the current data content of LBAs L1-L3, L5, and L6.

Yet further, as shown in FIG. 3C, snapshot snap3 includes nine data blocks L5-L10 and L17-L19 (which represent the content of data set X that has changed since snap2) and the upload of snap3 creates two additional log segments in standard storage tier 132: seg6 (reference numeral 322) comprising data blocks L5-L9 of snap3 and seg7 (reference numeral 324) comprising data blocks L10 and L17-L19 of snap3. Like the scenario of snap2, the prior versions of data blocks L5-L10 and L17-L19 remain in their existing log segments but are considered superseded by the new versions associated with snap3.

As a supplement to FIGS. 3A-3C, listings 1-3 below present example metadata entries that may be populated by uploader server 116 in versioned data set map 124, chunk map 126, and SUT 128 respectively (per block 214 of workflow 200) as a result of the uploading of snap1, snap2, and snap3:

<X, snap1, L0>→<C1, N20>
<X, snap2, L1>→<C21, N3>
<X, snap2, L5>→<C24, N2>
<X, snap3, L5>→<C26, N6>
<X, snap3, L17>→<C32, N3>

Listing 1: Metadata Populated in Versioned Data Set Map

C1→<seg1, N5>
C6→<seg2, N5>
C11→<seg3, N5>
C16→<seg4, N5>
C21→<seg5, N3>
C24→<seg5, N2>
C26→<seg6, N5>
C31→<seg7, N1>
C32→<seg7, N3>

Listing 2: Metadata Populated in Chunk Map seg1→<LIVE5, TOTAL5>
seg2→<LIVE5, TOTAL5>
seg3→<LIVE5, TOTAL5>
seg4→<LIVE5, TOTAL5>
seg5→<LIVE5, TOTAL5> seg6→<LIVE5, TOTAL5>
seg7→<LIVE4, TOTAL4>

Listing 3: Metadata Populated in Segment Usage Table

Regarding listings 1 and 2, the metadata entries presented here can be understood as mapping the data blocks/LBAs of snap1, snap2, and snap3 (which are all different versions of data set X) to the log segments in which they are stored (i.e., seg1-seg7) per FIGS. 3A-3C. The particular schema employed by these metadata entries comprises a first mapping between each snapshot data block LBA and a "chunk ID" (e.g., C1) via versioned data set map 124 and a second mapping between each chunk ID and a log segment ID (e.g., seg1) via chunk map 126. This schema provides a level of indirection between the snapshot data blocks and their log segment locations, which allows for more efficient implementation of certain features in COS-DB system 102 such as data deduplication. In alternative embodiments, the chunk ID attribute can be removed and each snapshot data block LBA can be directly mapped to its corresponding log segment ID.

Further, the metadata entries presented in listings 1 and 2 make use of a range value (i.e., "N20", "N5," etc.) that effectively compresses multiple consecutive metadata entries in maps 124 and 126 into a single entry. For example, the first metadata entry shown in listing 1 (i.e., <x, snap1, L0>→<C1, N20>) includes the range value "N20," which indicates that this entry actually represents twenty metadata entries in versioned data set map 124 with sequentially increasing LBAs and chunk IDs as shown below:

<X, snap1, L0>→C1
<X, snap1, L1>→C2
<X, snap1, L19>→C20

Listing 4

Similarly, the first metadata entry shown in listing 2 (i.e., C1→<seg1, N5>) includes the range value "N5," which indicates that this entry actually represents five metadata entries in chunk map 126 with sequentially increasing chunk IDs as shown below:

C1→seg1
C2→seg1
C3→seg1
C4→seg1
C5→seg1

Listing 5

Regarding listing 3, the metadata entries presented here indicate the number of live data blocks and total data blocks included each log segment seg1-seg7 shown in FIGS. 3A-3C. As used herein, a "live" data block is one that is currently a part of, or referenced by, an existing (i.e., non-deleted) snapshot in the cloud object storage tier where that data block is stored. Thus, for example, seg1 has five live data blocks because it includes data blocks L0-L4 of snap1, which is an existing snapshot in standard storage tier 132 per the upload operation depicted in FIG. 3A. Conversely, a "dead" data block is one that is not currently a part of, or referenced by, an existing snapshot in the cloud object storage tier where that data block is stored (and thus can be deleted). The significance of this live/dead distinction is discussed with respect to garbage collector 120 in subsection (2.3) below.

2.2 Snapshot Lifecycle Manager

Snapshot lifecycle manager 118 is a component of COS-DB system 102 that (1) allows users/administrators of the system to create retention policies for automatically deleting uploaded snapshots from cloud object storage platform 108 according to sets of rules, and (2) enforces the created retention policies. Thus, snapshot lifecycle manager 118 enables the system users/administrators to limit the total number of snapshots maintained in cloud object storage platform 108 and ensure that the snapshots present at a given point in time within platform 108 are those which are most relevant to the backup use case envisioned for their corresponding source data set(s) (e.g., data set X).

One common type of retention policy that can be created via snapshot lifecycle manager 118 is a "non-linear" policy that gradually keeps fewer and fewer snapshots in cloud object storage platform 108 based on increasing time period thresholds (e.g., hourly, daily, weekly, monthly, yearly, etc.). For example, a user/administrator of COS-DB system 102 may define a non-linear retention policy for the snapshots of data set X that keeps in standard storage tier 132 (1) the 48 most recent half-hourly snapshots of X (and automatically deletes all older half-hourly snapshots), (2) the 30 most recent daily snapshots of X (and automatically deletes all older daily snapshots), (3) the 12 most recent monthly snapshots of X (and automatically deletes all older monthly snapshots), and (4) the 7 most recent yearly snapshots of X (and automatically deletes all older yearly snapshots). With this type of policy, it is unlikely that a snapshot created/uploaded more than, e.g., 365 days ago will be deleted within the next 365 days in accordance with the policy's rules because such a snapshot will necessarily be a yearly snapshot that has only a 1 in 6 (i.e., ~16%) chance of being deleted at the next yearly threshold. This is relevant for defining "old" versus "new" snapshots as discussed in sections (3) and (4) below.

2.3 Garbage Collector

One consequence of deleting a snapshot from cloud object storage platform 108 that has been uploaded in accordance with workflow 200 of FIG. 2—either via a manual deletion operation or an automated deletion operation carried out by snapshot lifecycle manager 118—is that the deletion can result in dead data blocks in certain log segments. As noted previously, a dead data block is one that is not part of, or referenced by, any existing (i.e., non-deleted) snapshot in the cloud object storage tier where that data block is stored, and thus should ideally be deleted to free the storage space it consumes.

To understand this phenomenon, consider the scenarios shown in FIGS. 3A-3C where snapshots snap1-snap3 of data set X are sequentially uploaded to standard storage tier 132 of cloud object storage platform 108. Assume that after the upload of snap3, snap1 is deleted from tier 132. In this case, data blocks L1-L3, L5-L10, and L17-L19 of snap1 in log segments seg1-seg4 are rendered dead because, while they are still stored in standard storage tier 132 via these log segments, their corresponding snapshot snap1 is now gone/deleted and these data blocks will never be referenced by another, later snapshot (by virtue of being superseded by the new versions of these data blocks in snap2 and snap3). Accordingly, these dead data blocks in seg1-seg4 are unnecessarily consuming storage space and should be deleted.

Figure 4:
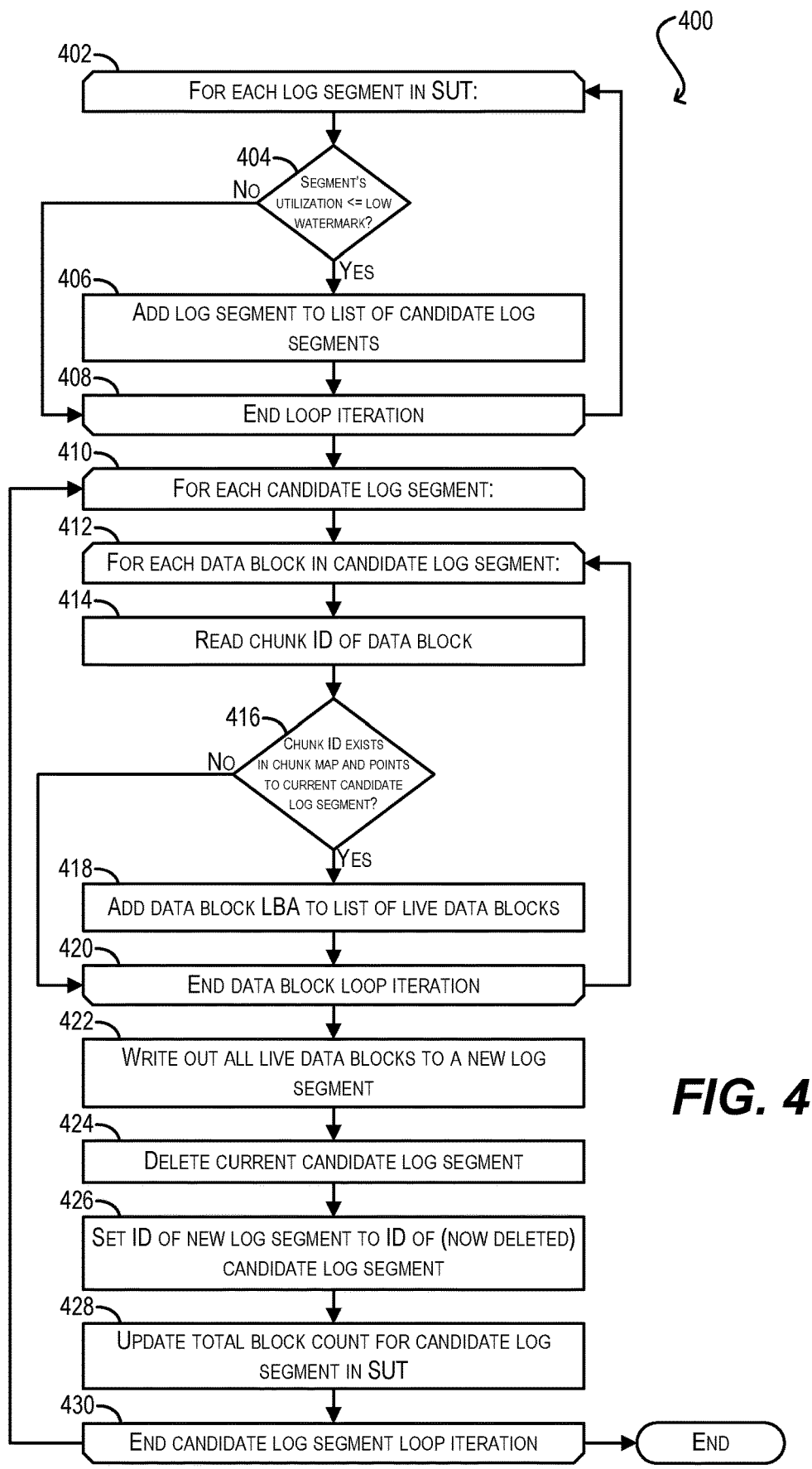
FIG. 4 depicts a garbage collection workflow according to certain embodiments.

To handle the foregoing and other similar scenarios, garbage collector 120 of COS-DB system 102 can periodically carry out a garbage collection (also known as "segment cleaning") process to identify and delete dead data blocks from the log segments maintained in cloud object storage platform 108. FIG. 4 depicts a workflow 400 of this garbage collection process according to certain embodiments. Workflow 400 assumes that, at the time a given snapshot is deleted from cloud object storage platform 108, the metadata entries mapping the data blocks of that snapshot to their corresponding log segments are removed from versioned data set map 124 and chunk map 126. Workflow 400 also assumes that the SUT entries of the affected segments in SUT 128 are updated to reflect an appropriately reduced live data block count for those log segments.

Starting with steps 402 and 404, garbage collector 102 can enter a loop for each log segment in SUT 128 and determine, from the log segment's SUT entry, whether the log segment's "utilization rate" (i.e., its number of live data blocks divided by its number of total data blocks) is less than or equal to some low watermark (e.g., 50%). If the answer is yes, garbage collector 120 can add that log segment to a list of "candidate" log segments that will be garbage collected (step 406). If the answer is no, garbage collector 120 can take no action. Garbage collector 120 can then reach the end of the current loop iteration (step 408) and repeat the foregoing steps for each additional log segment in SUT 128.

Once all log segments have been processed, garbage collector 120 can enter a loop for each candidate log segment identified per step 406 (step 410) and another loop for each data block of the candidate log segment (step 412). Within the data block loop, garbage collector 120 can read the chunk ID of the data block (step 414) and check whether the data block's chunk ID exists in chunk map 126 and points to the current candidate log segment within the chunk map (step 416). If the answer is yes, garbage collector 120 can conclude that the current data block is a live data block and add the data block's LBA to a list of live data blocks (step 418). On the other hand, if the answer at step 416 is no, garbage collector 120 can conclude that the current data block is a dead data block and take no action. Garbage collector 120 can then reach the end of the current iteration for the data block loop (step 420) and repeat steps 412-420 until all data blocks within the current candidate log segment have been processed.

At steps 422-426, garbage collector 120 can write out all of the live data blocks identified for the current candidate log segment (per step 418) to a new log segment, delete the current candidate log segment, and set the ID of the new log segment created at block 422 to the ID of the (now deleted) current candidate log segment, thereby effectively "shrinking" the current candidate log segment to include only its live data blocks (and exclude the dead data blocks). Garbage collector 120 can also update the total data block count for the current candidate log segment in SUT 128 accordingly (step 428).

Finally, at step 430, garbage collector 120 can reach the end of the current iteration of the candidate log segment loop and repeat steps 410-430 for the next candidate log segment. Once all candidate log segments have been processed, workflow 400 can end.

3. High-Level Solution Description

As noted previously, in addition to standard storage tier 132, cloud object storage platform 108 includes at least one cold storage tier 134 that offers significantly lower cost per storage unit. Accordingly, it would be useful to leverage cold storage tier 134 to hold some portion of the snapshot data for data set X that is uploaded to standard storage tier 132 and thereby reduce the overall storage costs for maintaining that data in cloud object storage platform 108. However, because cold storage tier 134 is intended to store infrequently accessed data, it is subject to a number of restrictions/drawbacks such as high retrieval latency, high retrieval API cost, and an extra charge for deleting data from this tier before a prescribed time period (i.e., the minimum storage duration) has passed. These restrictions make it impractical to simply move (i.e., tier) log segments for the snapshots of X from standard storage tier 132 to cold storage tier 134 in an ad hoc manner, because this may result in scenarios where such tiered log segments need to be accessed (due to, e.g., a snapshot restore operation) or deleted (due to, e.g., a retention policy deletion operation) from cold storage tier 134 soon after they are moved, resulting in poor access performance and high retrieval or deletion costs.

Figure 5:
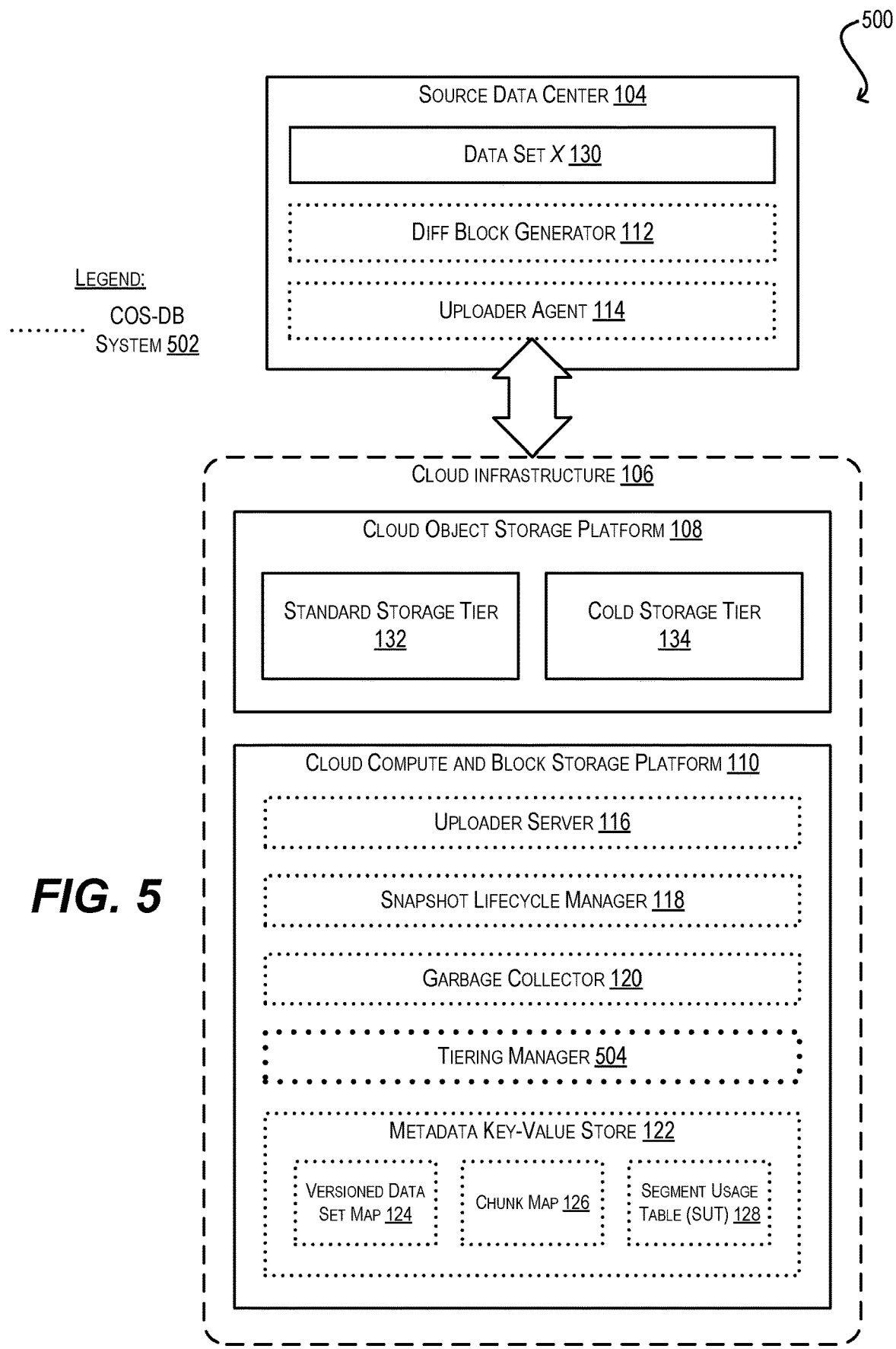
FIG. 5 depicts an enhanced version of the COS-DB system of FIG. 1 according to certain embodiments.

To address the foregoing, FIG. 5 depicts a system environment 500 comprising an enhanced version of COS-DB system 102 of FIG. 1 (i.e., COS-DB system 502) that includes a novel tiering manager 504. In the example of FIG. 5, tiering manager 504 is shown as running on cloud compute and block storage platform 110 like snapshot lifecycle manager 118 and garbage collector 120; however, in alternative embodiments tiering manager 504 may run at other locations/systems, such as at source data center 104 or some other component/platform of cloud infrastructure 106.

At a high level, tiering manager 504 can carry out a process (as shown via workflow 600 of FIG. 6) for intelligently tiering portions of the snapshots of data set X in standard storage tier 132 to cold storage tier 134. Starting with step 602 of workflow 600, tiering manager 504 can identify old snapshots of data set X that have been uploaded to and reside in standard storage tier 132, where an "old" snapshot is one that is unlikely to be deleted from cloud object storage platform 108 within the minimum storage duration imposed by the provider of platform 108 on cold storage tier 134. For example, if the minimum storage duration imposed by the cloud object storage provider is 365 days, an old snapshot of data set X will be any such snapshot that is unlikely to be deleted within 365 days.

In the scenario where a non-linear retention policy has been established for the snapshots of data set X, an old snapshot can specifically be any snapshot of X created/uploaded to standard storage tier 132 at least N days ago, where N days is the minimum storage duration. This is because under the rules of such a non-linear retention policy, a snapshot created/uploaded at least N days ago is unlikely (e.g., has less than a 50% likelihood) to be deleted within the next N day period, as discussed in section (2.2) above.

Upon identifying the old snapshots of data set X, tiering manager 504 can enter a loop for each old snapshot (step 604). Within this loop, tiering manager 504 can identify data blocks in the snapshot that are superseded by later snapshots of X that are also "old" (block 606). For example, with respect to FIG. 3C, assume snap1, snap2, and snap3 are all old snapshots as defined above. In this case, for snap1, the data blocks of snap1 that are superseded by other old snapshots of X (i.e., snap2 and snap3) are data blocks L1-L3, L5-L10, and L17-L19, because newer versions of these data blocks exist in snap2 and snap3.

Tiering manager 504 can then write the data blocks identified at step 606 (in the form of new log segments) to cold storage tier 134 (step 608) and update metadata maps/tables 124-128 to indicate that the data blocks are now dead in their existing log segments in standard storage tier 132 (step 610), thereby effectively moving (i.e., tiering) those data blocks from the standard storage tier to the cold storage tier. The metadata updates performed at step 610 will cause garbage collector 120 to eventually delete the tiered data blocks from standard storage tier 132 in accordance with its garbage collection processing shown in FIG. 4.

Finally, at step 612, tiering manager 504 can reach the end of the current loop iteration and return to step 604 in order to process the next old snapshot of X This can continue until tiering manager 504 has processed all of the old snapshots, at which point workflow 600 can end.

The benefits provided by tiering manager 504 via high-level workflow 600 are twofold: first, by moving portions of old snapshots of data set X from the more expensive standard storage tier to the less expensive cloud storage tier, it reduces the storage cost for maintaining these snapshots in cloud object storage platform 108. If this tiering mechanism is applied to a large number of data sets (which will typically be the case for enterprise users of COS-DB system 102), this can result in significant cost savings.

Second, by intelligently moving only superseded data blocks of the old snapshots to cold storage tier 134, tiering manager 504 ensures that more frequently accessed and/or deleted snapshot data remain on standard storage tier 132, thereby avoiding the restrictions and drawbacks of cold storage tier 134 with respect to that frequently accessed/deleted data.

Figure 6:
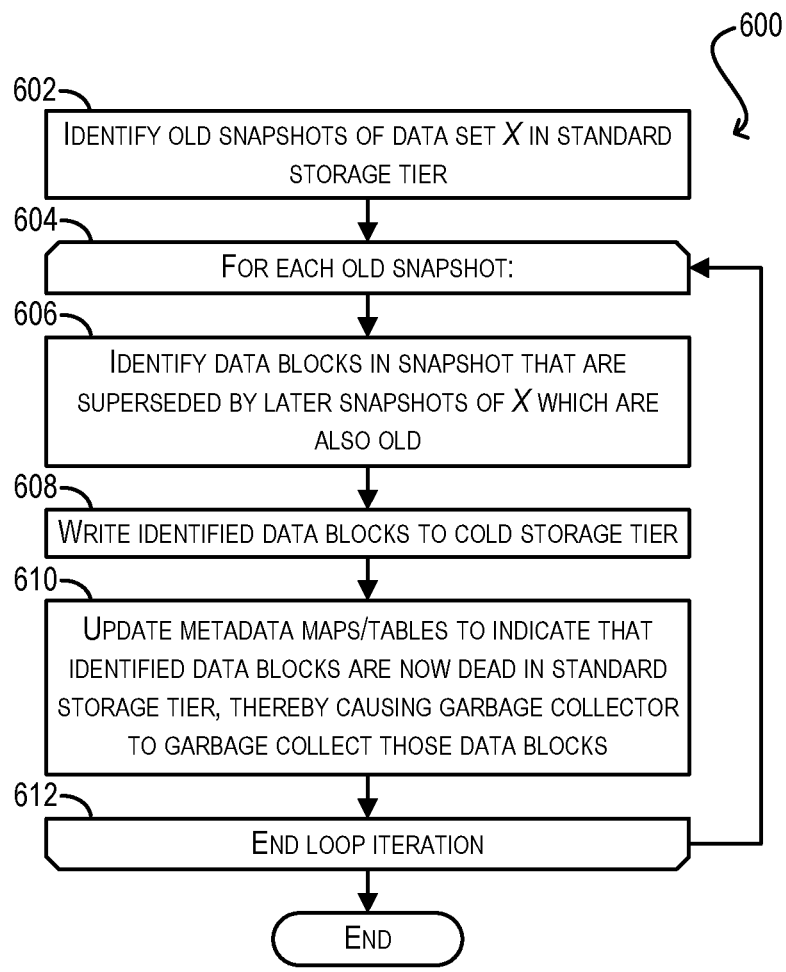
FIG. 6 depicts a first tiering workflow according to certain embodiments.

It should be appreciated that FIGS. 5 and 6 are illustrative and not intended to limit embodiments of the present disclosure. For example, although workflow 600 of FIG. 6 is directed to the movement of snapshot data from standard storage tier 132 to cold storage tier 134, in some embodiments tiering manager 504 can use the same or substantially similar logic to move snapshot data from cold storage tier 134 to another, "colder" (i.e., even less expensive) storage tier of cloud object storage platform 108. This is useful for cloud object storage platforms such as, e.g., Amazon S3 that offer multiple levels of cold storage, as it allows for potentially greater cost savings via the progressive tiering of data from one cold storage tier to another. In these embodiments, the definition of an "old" snapshot may change for each tiering operation based on the minimum storage duration (and/or other characteristics) of the target cold storage tier.

Further, although FIG. 5 depicts a particular arrangement of entities/components within operating environment 500 and COS-DB system 502, other arrangements are possible (e.g., the functionality attributed to one entity/component may be split into multiple entities/components, certain entities/components may be combined, etc.). In addition, each entity/component may include sub-components or implement functionality that is not specifically described. One of ordinary skill in the art will recognize other variations, modifications, and alternatives.

4. Detailed Tiering Workflow

Figure 7:
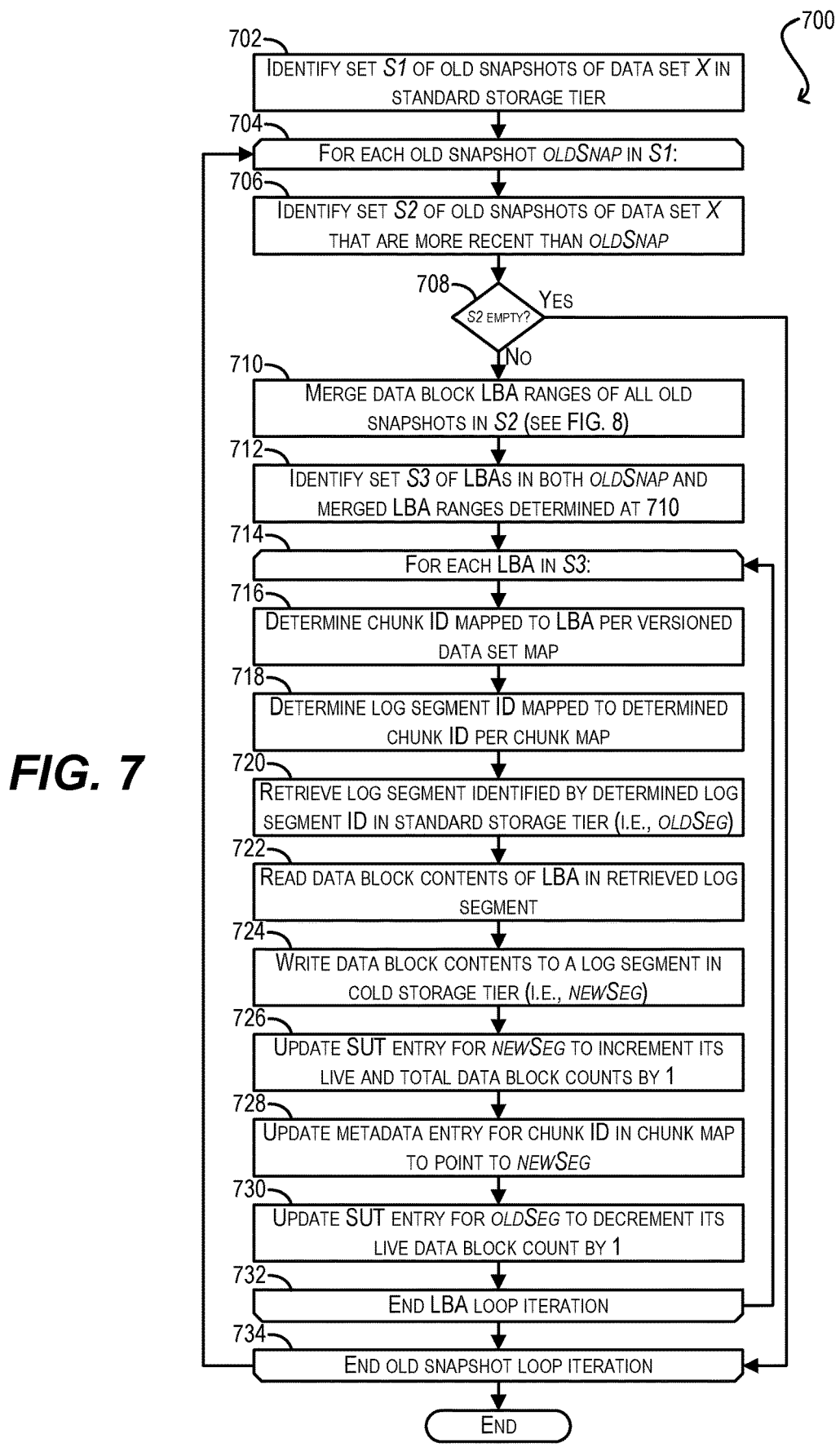
FIG. 7 depicts a second tiering workflow according to certain embodiments.

FIG. 7 depicts a workflow 700 that provides additional implementation details regarding the tiering process performed by tiering manager 504 of FIG. 5 (and described at a high level in workflow 600 of FIG. 6) with respect to the snapshots of data set X according to certain embodiments. Workflow 700 may be initiated by tiering manager 504 on a periodic basis or in response to detecting that one or more snapshots of X in standard storage tier 132 of cloud object storage platform 108 have become old. Further, workflow 700 assumes that the metadata for the snapshots of X are organized/structured in metadata maps/tables 124-128 according to the specific schemas described in section (2.1) above.

Starting with step 702, tiering manager 504 can identify a set S1 of all old snapshots of data set X in standard storage tier 132, where an old snapshot is one that meets the criteria mentioned previously. In a particular embodiment, tiering manager 504 can build set S1 by traversing through versioned data set map 124 and identifying all of the snapshots associated with data set X whose creation/upload timestamp qualify it as an "old" snapshot.

At steps 704 and 706, tiering manager 504 can enter a loop for each old snapshot oldSnap in S1 and can identify a set S2 of old snapshots of X that are more recent (e.g., have a later creation/upload timestamp) than oldSnap. Tiering manager 504 can then check whether set S2 is empty (step 708).

Figure 8:
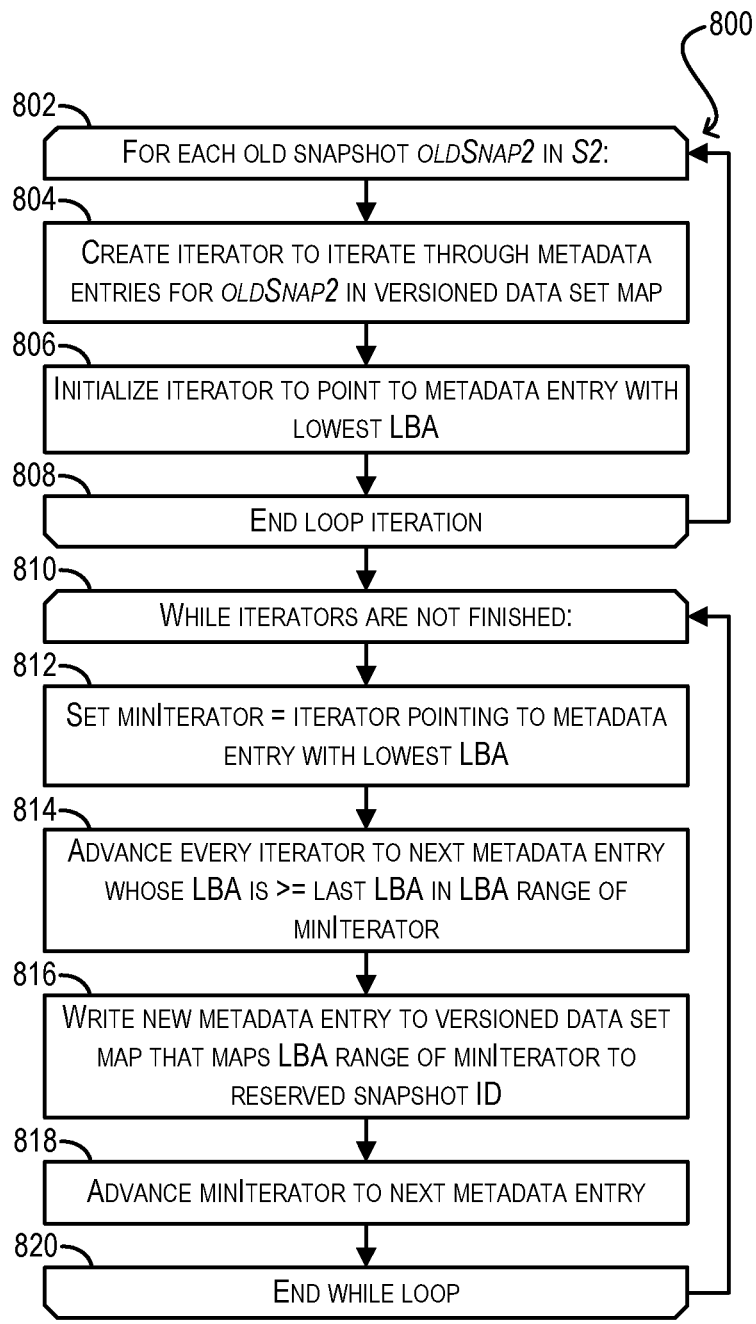
FIG. 8 depicts an algorithm for merging LBA ranges in a set of snapshots according to certain embodiments.

If the answer at step 708 is yes, tiering manager 504 proceed to the end of the current loop iteration. However, if the answer at step 708 is no, tiering manager 504 can merge the data block LBA ranges of all old snapshots in S2 (step 710). FIG. 8 depicts a particular algorithm 800 for performing this merging in an efficient manner according to an embodiment. At step 802 of FIG. 8, tiering manager 504 can enter a loop for each old snapshot oldSnap2 in S2. Within this loop, tiering manager 504 can create an iterator to iterate through the metadata entries identifying oldSnap2 in versioned data set map 124 (step 804) and can initialize the iterator to point to the metadata entry having the lowest LBA (step 806). For example, with respect to the metadata entries of versioned data set map 124 shown in listing 1, if oldSnap2 is snap2, an iterator would be created to iterate through the entries identifying snap2 and this iterator would be initialized to point to the entry <X, snap2, L1>→<C21, N3> because this entry identifies the lowest LBA (i.e., L1) from among to two entries for snap2 in map 124. At step 808, tiering manager 504 can reach the end of the current loop iteration and repeat steps 802-808 for each additional old snapshot in S2.

At step 810, tiering manager 504 can enter a loop that continues to run until all of the iterators created at step 804 have not yet finished (i.e., have not yet reached the end of the metadata entries for their respective snapshots in versioned data set map 124). Within this loop, tiering manager 504 can set a minimum iterator variable (i.e., minIterator) as equal to the iterator that has the lowest LBA in the metadata entry the iterator is currently pointing to (step 812). Tiering manager 504 can further advance every iterator to the next metadata entry whose LBA is equal to or greater than the last LBA in the "LBA range" of the minIterator (i.e., the LBA specified in the minIterator's metadata entry, plus the value of the entry's range value (e.g., "N5"), if present) (step 814).

Upon advancing the iterators, tiering manager 504 can write a new metadata entry to versioned data set map 124 that maps the LBA range of minIterator to a reserved snapshot ID for data set X (e.g., snap9999999999) (step 816). Tiering manager 504 can then advance minIterator to the next metadata entry in versioned data set map 124 for its corresponding snapshot (step 818), reach the end of the while loop (step 820), and repeat steps 810-820 until all of the iterators have finished. At the conclusion of the while loop, the metadata entries associated with the reserved snapshot ID in versioned data set map 124 will identify the merged LBA ranges of all old snapshots in set S2.

Returning now to FIG. 7, at steps 712 and 714, tiering manager 504 can identify a set S3 of data block LBAs that are included in both oldSnap and the merged LBA ranges determined at step 710 and can enter a loop for each LBA in set S3. Within this loop, tiering manager 504 can determine the chunk ID mapped to the LBA per versioned data set map 124 (step 716), determine the log segment ID mapped to the determined chunk ID per chunk map 126 (step 718), retrieve the log segment identified by the determined log segment ID in standard storage tier 132 (referred to as oldSeg) (step 720), and read the data block contents of that LBA in the retrieved log segment (step 722).

Tiering manager 504 can then write the data block contents to a log segment in cold storage tier 134 (referred to as newSeg) (step 724) and update the SUT entry for newSeg in SUT 128 to increment its live and total data block counts by one (step 726), thereby effectively moving the data block to cold storage tier 134. Tiering manager 504 can further update the metadata entry for the LBA's chunk ID in chunk map 126 to point to newSeg in cold storage tier 134 (step 728) and update the SUT entry for oldSeg in SUT 128 to reduce its number of live data blocks by one (step 730), which will cause garbage collector 120 to eventually garbage collect this data block from oldSeg in standard storage tier 132.

At step 732, tiering manager 504 can reach the end of the current iteration for the LBA loop and repeat steps 710-732 for the remaining LBAs in set S3. Finally, at step 734, tiering manager 504 can reach the end of the current iteration for the old snapshot loop and return to step 704 to process the next oldSnap in set S1. Once all of the old snapshots in S1 have been processed workflow 700 can end.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
    identifying, by a computer system, one or more old snapshots of a data set that reside in a first storage tier of a cloud object storage platform, wherein the one or more old snapshots are snapshots that are unlikely to be deleted from the cloud object storage platform within a period of N days, and wherein the period of N days corresponds to a minimum storage duration imposed on the second storage tier by a provider of the cloud object storage platform, the minimum storage duration being a minimum time period for which data should be maintained on the second storage tier prior to deletion in order to avoid an early deletion fee; and
    for each snapshot in the one or more old snapshots:
        identifying, by the computer system, one or more data blocks in the snapshot that are superseded by a more recent snapshot in the one or more old snapshots;
        writing, by the computer system, the one or more data blocks to a second storage tier of the cloud object storage platform that has a lower storage cost than the first storage tier; and
        causing, by the computer system, the one or more data blocks to be deleted from the first storage tier.

2. The method of claim 1 wherein the first storage tier is a standard storage tier of the cloud object storage platform and wherein the second storage tier is a cold storage tier of the cloud object storage platform.

3. The method of claim 1 wherein the first storage tier is a first cold storage tier of the cloud object storage platform and wherein the second storage tier is a second cold storage tier of the cloud object storage platform.

4. The method of claim 1 wherein the data set is associated with a non-linear snapshot retention policy and wherein the one or more old snapshots are snapshots created at least N days ago.

5. The method of claim 1 wherein causing the one or more data blocks to be deleted from the first storage tier comprises:

updating one or more metadata structures to indicate that the one or more data blocks are no longer a part of, or referenced by, an existing snapshot in the first storage tier.

6. The method of claim 5 wherein upon updating the one or more metadata structures, the one or more data blocks are garbage collected from the first storage tier by a garbage collector component running in a cloud compute platform associated with the cloud object storage platform.

7. A non-transitory computer readable storage medium having stored thereon program code executable by a computer system, the program code embodying a method comprising:
  identifying one or more old snapshots of a data set that reside in a first storage tier of a cloud object storage platform, wherein the one or more old snapshots are snapshots that are unlikely to be deleted from the cloud object storage platform within a period of N days, and wherein the period of N days corresponds to a minimum storage duration imposed on the second storage tier by a provider of the cloud object storage platform, the minimum storage duration being a minimum time period for which data should be maintained on the second storage tier prior to deletion in order to avoid an early deletion fee; and
  for each snapshot in the one or more old snapshots:
    identifying one or more data blocks in the snapshot that are superseded by a more recent snapshot in the one or more old snapshots;
    writing the one or more data blocks to a second storage tier of the cloud object storage platform that has a lower storage cost than the first storage tier; and
    causing the one or more data blocks to be deleted from the first storage tier.

8. The non-transitory computer readable storage medium of claim 7 wherein the first storage tier is a standard storage tier of the cloud object storage platform and wherein the second storage tier is a cold storage tier of the cloud object storage platform.

9. The non-transitory computer readable storage medium of claim 7 wherein the first storage tier is a first cold storage tier of the cloud object storage platform and wherein the second storage tier is a second cold storage tier of the cloud object storage platform.

10. The non-transitory computer readable storage medium of claim 7 wherein the data set is associated with a non-linear snapshot retention policy and wherein the one or more old snapshots are snapshots created at least N days ago.

11. The non-transitory computer readable storage medium of claim 7 wherein causing the one or more data blocks to be deleted from the first storage tier comprises:
  updating one or more metadata structures to indicate that the one or more data blocks are no longer a part of, or referenced by, an existing snapshot in the first storage tier.

12. The non-transitory computer readable storage medium of claim 11 wherein upon updating the one or more metadata structures, the one or more data blocks are garbage collected from the first storage tier by a garbage collector component running in a cloud compute platform associated with the cloud object storage platform.

13. A computer system comprising:
  a processor; and
  a non-transitory computer readable medium having stored thereon program code that, when executed, causes the processor to:
    identify one or more old snapshots of a data set that reside in a first storage tier of a cloud object storage platform, wherein the one or more old snapshots are snapshots that are unlikely to be deleted from the cloud object storage platform within a period of N days, and wherein the period of N days corresponds to a minimum storage duration imposed on the second storage tier by a provider of the cloud object storage platform, the minimum storage duration being a minimum time period for which data should be maintained on the second storage tier prior to deletion in order to avoid an early deletion fee; and
    for each snapshot in the one or more old snapshots:
      identify one or more data blocks in the snapshot that are superseded by a more recent snapshot in the one or more old snapshots;
      write the one or more data blocks to a second storage tier of the cloud object storage platform that has a lower storage cost than the first storage tier; and
      cause the one or more data blocks to be deleted from the first storage tier.

14. The computer system of claim 13 wherein the first storage tier is a standard storage tier of the cloud object storage platform and wherein the second storage tier is a cold storage tier of the cloud object storage platform.

15. The computer system of claim 13 wherein the first storage tier is a first cold storage tier of the cloud object storage platform and wherein the second storage tier is a second cold storage tier of the cloud object storage platform.

16. The computer system of claim 13 wherein the data set is associated with a non-linear snapshot retention policy and wherein the one or more old snapshots are snapshots created at least N days ago.

17. The computer system of claim 13 wherein causing the one or more data blocks to be deleted from the first storage tier comprises:
  updating one or more metadata structures to indicate that the one or more data blocks are no longer a part of, or referenced by, an existing snapshot in the first storage tier.

18. The computer system of claim 17 wherein upon updating the one or more metadata structures, the one or more data blocks are garbage collected from the first storage tier by a garbage collector component running in a cloud compute platform associated with the cloud object storage platform.

* * * * *